United States Patent
Okamoto et al.

[11] Patent Number: 5,847,980
[45] Date of Patent: Dec. 8, 1998

[54] PRODUCT-SUMMING ARITHMETIC CIRCUIT

[75] Inventors: Kiyoshi Okamoto; Toshiyuki Araki; Takuya Jinbo, all of Osaka, Japan

[73] Assignee: Matsushita Electric Industrial Co., Ltd., Osaka, Japan

[21] Appl. No.: 711,836

[22] Filed: Sep. 10, 1996

[30] Foreign Application Priority Data

Sep. 12, 1995 [JP] Japan .................................... 7-233708

[51] Int. Cl.[6] .............................. G06F 7/00; G06F 15/00; G06F 17/14
[52] U.S. Cl. .................................... 364/750.5; 364/725.03
[58] Field of Search .......................... 364/725.01–725.03, 364/726.07, 745.02, 745.03, 748.02, 748.03, 750.5, 758, 760.01, 760.02, 786.02–786.04

[56] References Cited

U.S. PATENT DOCUMENTS

| | | | |
|---|---|---|---|
| 4,791,598 | 12/1988 | Liou et al. | 364/725.03 |
| 5,053,985 | 10/1991 | Kao | 364/725.02 |
| 5,204,830 | 4/1993 | Wang et al. | 364/754.02 |
| 5,307,375 | 4/1994 | Wu et al. | 375/236 |
| 5,442,579 | 8/1995 | Thomson | 364/760.01 |
| 5,457,646 | 10/1995 | Jang et al. | 364/757 |
| 5,483,475 | 1/1996 | Friedlander et al. | 364/725.03 |

FOREIGN PATENT DOCUMENTS

| | | |
|---|---|---|
| 63-168772 | 7/1988 | Japan . |
| 6-103299 | 4/1994 | Japan . |

*Primary Examiner*—Emmanuel L. Moise
*Attorney, Agent, or Firm*—McDermott, Will & Emery

[57] ABSTRACT

In an IDCT circuit, a first RAC and a second RAC each have a ROM for sequentially generating a plurality of partial products and an accumulator for performing a digit-adjustment accumulation of the generated partial products while truncating the LSB of an intermediate accumulation result for every cycle. The first RAC further has a carry bit generator for holding a carry bit of one cycle before and for generating a carry bit of a current cycle by performing a majority arithmetic operation of the LSB of an intermediate accumulation result of the first RAC, the LSB of an intermediate accumulation result of the second RAC and the one-cycle-before carry bit. The second RAC further has a borrow bit generator for holding a borrow bit of one cycle before and for generating a borrow bit of a current cycle by performing a majority arithmetic operation of the LSB of an intermediate accumulation result of the first RAC, an inverted bit of the LSB of an intermediate accumulation result of the second RAC and the one-cycle-before borrow bit. A final accumulation result of the first RAC, a final accumulation result of the second RAC, a final carry bit and a final borrow bit are used in butterfly arithmetic operations.

6 Claims, 3 Drawing Sheets

PRODUCT-SUMMING ARITHMETIC CIRCUIT

BACKGROUND OF THE INVENTION

The present invention relates to a product-summing arithmetic circuit particularly suitable for use in an inverse discrete cosine transformation circuit.

Recently, small and high-speed circuits for implementation of orthogonal transformations have been in demand, since such circuits play an important role in high-efficiency compression coding of image information, audio information and the like. Forward orthogonal transformation is required in the coder. On the other hand, inverse orthogonal transformation is required in the decoder. DCT (Discrete Cosine Transform) and IDCT (Inverse Discrete Cosine Transform) are well known in the art.

U.S. Pat. No. 4,791,598 shows the structure of a one-dimensional DCT circuit. This DCT circuit employs both a technique known as first-stage decimation-in-frequency and a technique known as distributed arithmetic, to find vector inner products without a multiplier. The DCT circuit comprises a bit slice generator, a butterfly arithmetic unit, and a plurality of ROMs/accumulators (RACs). Each RAC performs a respective product-summing operation and is composed of at least one ROM for storing, in look-up table format, partial products which are based on a discrete cosine matrix and an accumulator for finding an inner product corresponding to an input vector by performing a digit-adjustment accumulation of partial products sequentially indexed from the ROM.

A conventional IDCT circuit corresponding to the above-described DCT circuit comprises a bit slice generator, a plurality of RACs, and a butterfly arithmetic unit. More specifically, separate accumulations are executed by two RACs. These two accumulations start at their respective initial values and are completed in M cycles where the number M is an integer. On an i-th cycle, in one of the RACs an i-th accumulation result and an i-th partial product are added together to obtain an (i+1)-th accumulation result and, at the same time, in the other RAC an i-th accumulation result and an i-th partial product are added together to obtain an (i+1)-th accumulation result. Finally, an addition/subtraction is performed on two final accumulation results, and M low-order bits of the result are truncated to obtain a final arithmetic operation result.

As described above, two accumulations are performed in a prior art technique and the process of truncation is carried out after performing an addition/subtraction of the accumulation results. The reason why such truncation is executed not before but after performing an addition/subtraction is to maintain adequate arithmetic precision. As a result, in each RAC both the bit width of the register for holding accumulation results and the bit width of the adder/subtracter for butterfly operations considerably increase, resulting in producing the problem that the chip area of the integrated IDCT circuit increases.

SUMMARY OF THE INVENTION

Accordingly, it is an object of the present invention to reduce the register bit width and the adder/subtracter bit width in each RAC.

For this object to be achieved, in each of two RACs the least significant bit (LSB) of an intermediate accumulation result is truncated while performing a digit-adjustment accumulation of a plurality of partial products for every cycle and, based on both of the two LSBs truncated, the propagation of carries or borrows for the generation of final carry bits or final borrow bits necessary for butterfly arithmetic operations, is controlled.

DETAILED DESCRIPTION OF THE INVENTION

Figure 1:
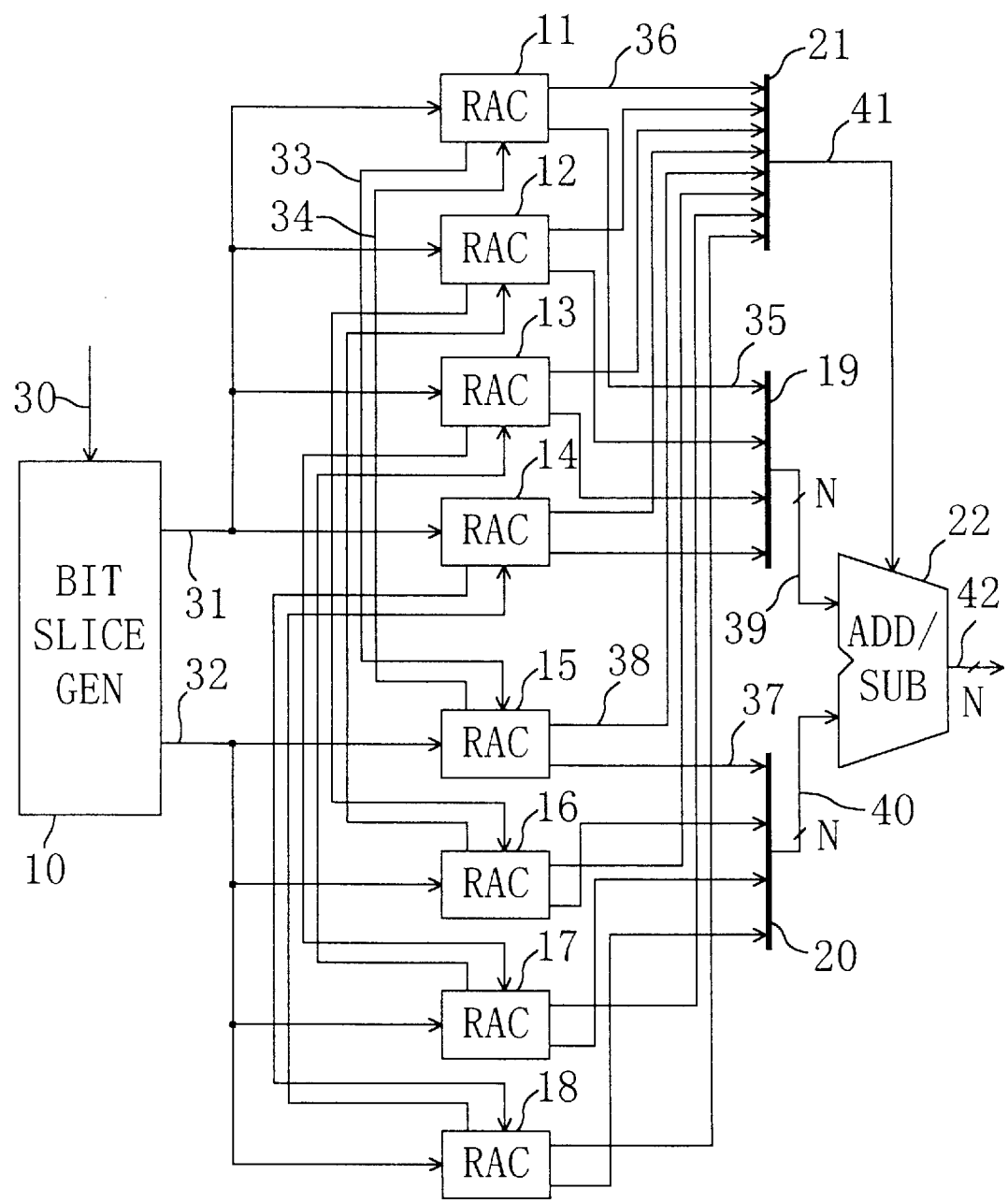
FIG. 1 is a block diagram of the structure of an IDCT circuit of one embodiment of the present invention.

Referring first to FIG. 1, there is illustrated an IDCT circuit in accordance with an embodiment of the present invention. 10 is a bit slice generator. 11–18 are RACs. 19, 20 and 21 are a first multiplexer, a second multiplexer and a third multiplexer. 22 is an N-bit-width adder/subtracter. 30 is an input data string. 31 is a first i-th cycle bit slice and 32 is a second i-th cycle bit slice where the number i is an integer of from 0 to M−1. 33 is the LSB of an i-th cycle accumulation result of the RAC 11 and 34 is the LSB of an i-th cycle accumulation result of the RAC 15. 35 is an N-bit-width final accumulation result of the RAC 11. 36 is a final carry bit of the RAC 11. 37 is an N-bit-width final accumulation result of the RAC 15. 38 is a final borrow bit of the RAC 15. 39 is the output of the first multiplexer 19. 40 is the output of the second multiplexer 20. 41 is the output of the third multiplexer 21. 42 is an N-bit-width final arithmetic operation result. For example, M=16, and either N=8 or N=9.

Referring to FIG. 1, when the input data string 30 is fed to the bit slice generator 10, the first and second bit slices 31 and 32 are generated for every cycle. The first bit slice 31 is fed to each RAC 11–14. The second bit slice 32 is fed to each RAC 15–18.

The RACs 11–18 operate concurrently. For example, two accumulations are executed simultaneously in the RACs 11 and 15 and a butterfly arithmetic operation is performed in the adder/subtracter 22. Each of these two accumulations is started at a respective initial value and takes M cycles to finish. On an i-th cycle, an i-th accumulation result and an i-th partial product are added together and an (i+1)-th accumulation result is generated in the RAC 11, while in the RAC 15 an i-th accumulation result and an i-th partial product are added together and an (i+1)-th accumulation result is generated. The final accumulation result 35 and the final carry bit 36 of the RAC 11 and the final accumulation result 37 and the final borrow bit 38 occur simultaneously.

When a butterfly arithmetic operation of a final accumulation result of the RAC 11 and a final accumulation result of the RAC 15 is performed, the first and second multiplexers 19 and 20 select the final accumulation result 35 of the RAC 11 and the final accumulation result 37 of the RAC 15, respectively. The third multiplexer 21 selects the final carry bit 36 of the RAC 11 in the case of addition while in the case of subtraction the third multiplexer 21 selects the final borrow bit 38 of the RAC 15. The adder/subtracter 22 adds the outputs of the first to third multiplexers 39–41 in the case of addition. In other words, in the addition case, the final accumulation result 35 of the RAC 11, the final accumulation result 37 of the RAC 15 and the final carry bit 36 of the RAC 11 are summed together by the adder/subtracter 22, to obtain the final arithmetic operation result 42. On the other hand, in the case of subtraction, the adder/subtracter 22 subtracts from the output of the first multiplexer 39 a sum of the output of the second multiplexer 40 and the output of the third multiplexer 41. That is, in the subtraction case a sum of the final accumulation result 37 of the RAC 15 and the final borrow bit 36 of the RAC 15 is subtracted by the adder/subtracter 22 from the final accumulation result 35 of the RAC 11, to obtain the final arithmetic operation result 42.

Figure 2:
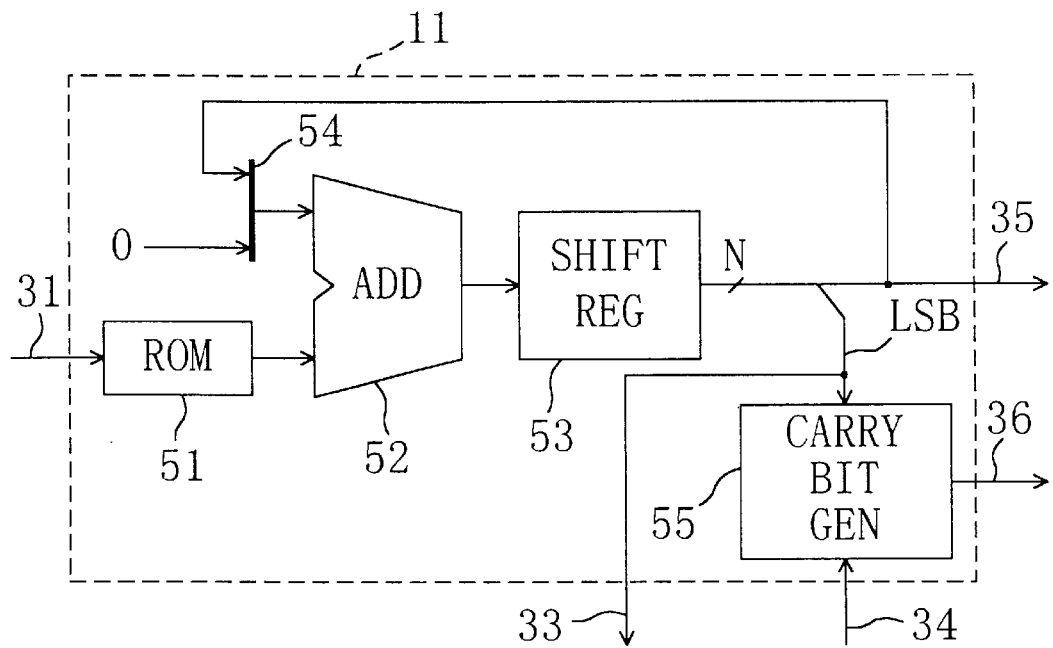
FIG. 2 is a block diagram of the internal structure of one of RACs of FIG. 1.

FIG. 2 is a block diagram of the internal structure of the RAC 11 shown in FIG. 1. 51 is a ROM for storing partial products based on an inverse discrete cosine matrix, in look-up table format. 52 is an adder. 53 is an N-bit-width shift register. 54 is a multiplexer. 55 is a carry bit generator. Of these components, the adder 52, the shift register 53 and the multiplexer 54 together constitute an accumulator for performing a digit-adjustment accumulation of partial products sequentially indexed from the ROM 51 while truncating the LSB of an intermediate accumulation result for each cycle. The RACs 12–14 are identical in structure with the RAC 11. In accordance with the RAC 11 of FIG. 2, the first bit slice 31 of the i-th cycle is fed into the ROM 51 and, as a result, an i-th partial product is read out of the ROM 51. The multiplexer 54 selects an initial value of 0, only on the first cycle. On cycles other than the first cycle, the multiplexer 54 selects an i-th accumulation result supplied from the shift register 53. The adder 52 provides a result of the addition of an i-th partial product and the output of the multiplexer 54 as an (i+1)-th accumulation result. The shift register 53 holds this (i+1)-th accumulation result for the period of one cycle. After such operation is performed M cycles, the shift register 53 provides the final accumulation result 35.

Figure 3:
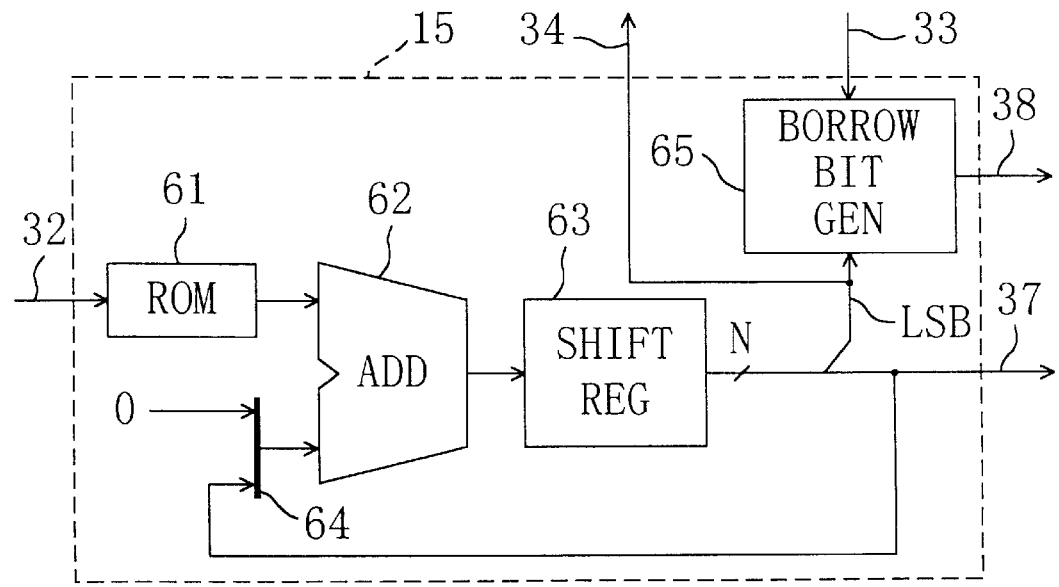
FIG. 3 is a block diagram of the internal structure of another of the RACs of FIG. 1.

FIG. 3 is a block diagram of the internal structure of the RAC 15 shown in FIG. 1. 61 is a ROM. 62 is an adder. 63 is an N-bit-width shift register. 64 is a multiplexer. 65 is a borrow bit generator. The RACs 16–18 are identical in structure with the RAC 15.

Figure 4:
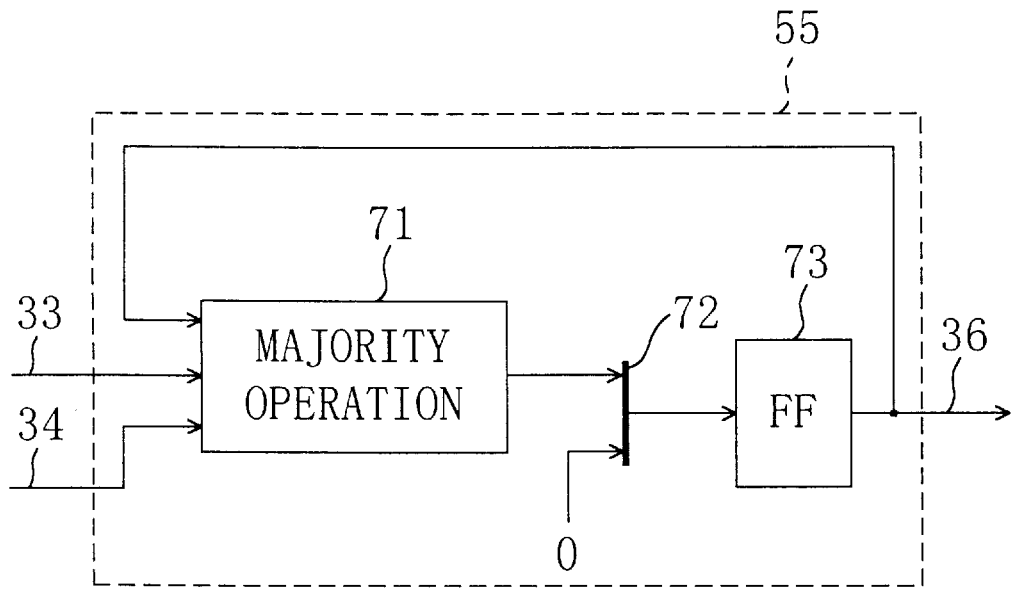
FIG. 4 is a block diagram of the internal structure of a carry bit generator of FIG. 2.

FIG. 4 is a block diagram of the internal structure of the carry bit generator 55 shown in FIG. 2. 71 is a majority arithmetic circuit. 72 is a multiplexer. 73 is a flip-flop. An LSB 33 (i.e., the LSB of an i-th cycle accumulation result of the RAC 11), an LSB 34 (the LSB of an i-th cycle accumulation result of the RAC 15) and an i-th carry bit held in the flip-flop 73 are fed into the majority arithmetic circuit 71. The multiplexer 72 selects an initial value of 0, only on the first cycle. On cycles other than the first cycle, the multiplexer 72 selects the output of the majority arithmetic circuit 71 and provides the output as an (i+1)-th carry bit. The flip-flop 73 holds this (i+1)-th carry bit for the period of one cycle. After such operation is performed M cycles, the flip-flop 73 provides the final carry bit 36.

Figure 5:
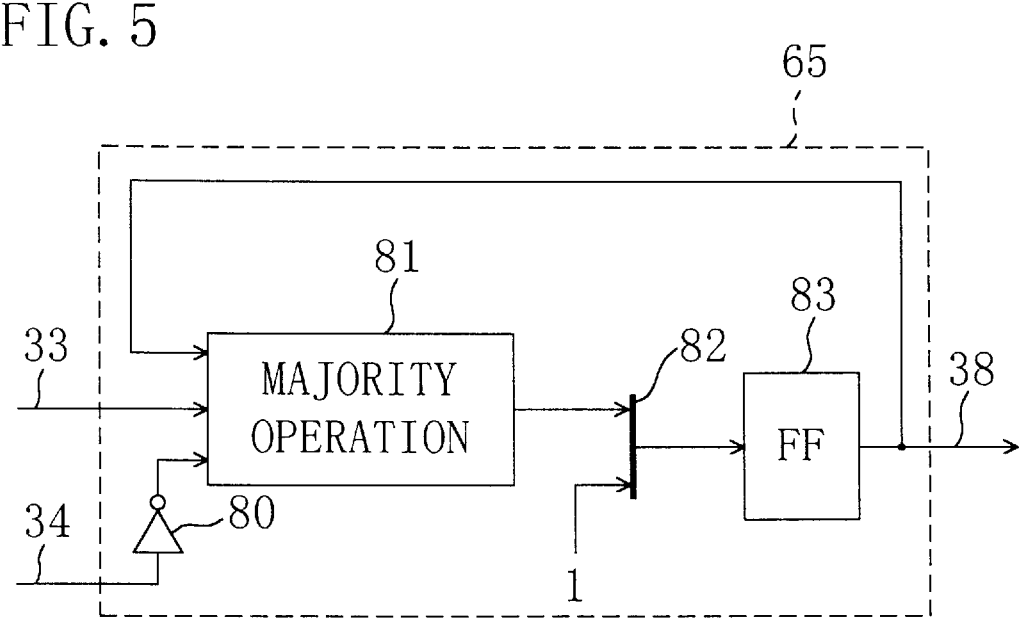
FIG. 5 is a block diagram of the internal structure of a borrow bit generator of FIG. 3.

FIG. 5 is a block diagram of the internal structure of the borrow bit generator 65 shown in FIG. 3. 80 is an inverter. 81 is a majority arithmetic circuit. 82 is a multiplexer. 83 is a flip-flop. An LSB 33 (i.e., the LSB of an i-th cycle accumulation result of the RAC 11), an inverted bit of an LSB 34 (the LSB of an i-th cycle accumulation result of the RAC 15) and an i-th borrow bit held in the flip-flop 83 are fed into the majority arithmetic circuit 81. The multiplexer 82 selects an initial value of 1, only on the first cycle. On cycles other than the first cycle, the multiplexer 82 selects the output of the majority arithmetic circuit 81 and provides the output as an (i+1)-th borrow bit. The flip-flop 83 holds this (i+1)-th borrow bit for the period of one cycle. After such operation is performed M cycles, the flip-flop 83 provides the final borrow bit 38.

In accordance with the IDCT circuit of FIG. 1, the LSB 33 and the LSB 34 are truncated for every cycle in the two RACs 11 and 15, respectively, while performing a digit-adjustment accumulation of a plurality of partial products. Additionally, based on the truncated LSBs 33 and 34, the propagation of carries for the generation of the final carry bit 36 and the propagation of borrows for the generation of the final borrow bit 37 are controlled, whereby the bit width of the shift registers 53 and 63 and the bit width of the adder/subtracter 22 can be reduced. As a result, the chip area of the integrated IDCT circuit is reduced. The present invention provides therefore desirable practical effects.

In the carry bit generator 55, carry propagation may be controlled by making use of a plurality of bits of an i-th cycle accumulation result of the RAC 11 including the LSB thereof and of a plurality of bits of an i-th cycle accumulation result of the RAC 15 including the LSB thereof. The same is applied to the borrow bit generator 65. It is possible for each RAC to perform accumulation processing of a plurality of partial products in one cycle.

In addition to applications in IDCT circuits, the present invention is applicable in product-summing circuits for use in digital filters in the field of signal processing technology.

The invention claimed is:

1. A product-summing arithmetic circuit comprising:
   a first circuit and a second circuit, each of said first and second circuits including means for sequentially generating a plurality of partial products and means for performing a digit-adjustment accumulation of said generated partial products while truncating the least significant bit (LSB) of an intermediate accumulation result for every cycle;
   carry bit generation means for holding a carry bit of one cycle before and for generating a carry bit of a current cycle by performing an addition of the LSB of an intermediate accumulation result of said first circuit, the LSB of an intermediate accumulation result of said second circuit and said one-cycle-before carry bit; and
   a third circuit for finding a final arithmetic operation result by performing an addition of a final accumulation result of said first circuit, a final accumulation result of said second circuit and a final carry bit of said carry bit generation means.

2. A product-summing arithmetic circuit according to claim 1,
   said carry bit generation means including:
   a flip-flop for holding said one-cycle-before carry bit; and
   means for generating said current-cycle carry bit by performing a majority arithmetic operation of the LSB of an intermediate accumulation result of said first circuit, the LSB of an intermediate accumulation result of said second circuit and said carry bit held in said flip-flop.

3. A product-summing arithmetic circuit comprising:
   a first circuit and a second circuit, each of said first and second circuits including means for sequentially generating a plurality of partial products and means for performing a digit-adjustment accumulation of said generated partial products while truncating the least significant bit (LSB) of an intermediate accumulation result for every cycle;

borrow bit generation means for holding a borrow bit of one cycle before and for generating a borrow bit of a current cycle by performing an addition of the LSB of an intermediate accumulation result of said first circuit, an inverted bit of the LSB of an intermediate accumulation result of said second circuit and said one-cycle-before borrow bit; and a third circuit for finding a final arithmetic operation result by performing a subtraction of a sum of a final accumulation result of said second circuit and a final borrow bit of said borrow bit generation means from a final accumulation result of said first circuit.

4. A product-summing arithmetic circuit according to claim 3, said borrow bit generation means including:

a flip-flop for holding said one-cycle-before borrow bit; and means for generating said current-cycle borrow bit by performing a majority arithmetic operation of the LSB of an intermediate accumulation result of said first circuit, an inverted bit of the LSB of an intermediate accumulation result of said second circuit and said borrow bit held in said flip-flop.

5. A product-summing arithmetic circuit comprising:

a first circuit and a second circuit, each of said first and second circuits including means for sequentially generating a plurality of partial products and means for performing a digit-adjustment accumulation of said generated partial products while truncating the least significant bit (LSB) of an intermediate accumulation result for every cycle;

carry bit generation means for holding a carry bit of one cycle before and for generating a carry bit of a current cycle by performing an addition of the LSB of an intermediate accumulation result of said first circuit, the LSB of an intermediate accumulation result of said second circuit and said one-cycle-before carry bit;

borrow bit generation means for holding a borrow bit of one cycle before and for generating a borrow bit of a current cycle by performing an addition of the LSB of an intermediate accumulation result of said first circuit, an inverted bit of the LSB of an intermediate accumulation result of said second circuit and said one-cycle-before borrow bit; and a third circuit capable of finding a final arithmetic operation result by performing an addition of a final accumulation result of said first circuit, a final accumulation result of said second circuit and a final carry bit of said carry bit generation means and capable of finding a final arithmetic operation result by performing a subtraction of a sum of a final accumulation result of said second circuit and a final borrow bit of said borrow bit generation means from a final accumulation result of said first circuit.

6. A product-summing arithmetic circuit according to claim 5, said carry bit generation means including:

a flip-flop for holding said one-cycle-before carry bit; and means for generating said current-cycle carry bit by performing a majority arithmetic operation of the LSB of an intermediate accumulation result of said first circuit, the LSB of an intermediate accumulation result of said second circuit and said carry bit held in said flip-flop;

said borrow bit generation means including:

a flip-flop for holding said one-cycle-before borrow bit; and means for generating said current-cycle borrow bit by performing a majority arithmetic operation of the LSB of an intermediate accumulation result of said first circuit, an inverted bit of the LSB of an intermediate accumulation result of said second circuit and said borrow bit held in said flip-flop.

* * * * *